(12) United States Patent
Totsuka

(10) Patent No.: US 12,106,498 B2
(45) Date of Patent: Oct. 1, 2024

(54) APPARATUS, METHOD, AND STORAGE MEDIUM

(71) Applicant: CANON KABUSHIKI KAISHA, Tokyo (JP)

(72) Inventor: Atsushi Totsuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 552 days.

(21) Appl. No.: 17/491,121

(22) Filed: Sep. 30, 2021

(65) Prior Publication Data

US 2022/0114742 A1 Apr. 14, 2022

(30) Foreign Application Priority Data

Oct. 9, 2020 (JP) .................. 2020-171103

(51) Int. Cl.
*G06T 7/40* (2017.01)
(52) U.S. Cl.
CPC ...... *G06T 7/40* (2013.01); *G06T 2207/20016* (2013.01)
(58) Field of Classification Search
CPC .......... G06T 7/40; G06T 2207/20016
See application file for complete search history.

(56) References Cited

U.S. PATENT DOCUMENTS

2020/0034652 A1* 1/2020 Inoshita .............. G06T 7/60

FOREIGN PATENT DOCUMENTS

JP 2013174464 A 9/2013

\* cited by examiner

*Primary Examiner* — Sam Bhattacharya
(74) *Attorney, Agent, or Firm* — Canon U.S.A., Inc. IP Division

(57) ABSTRACT

An apparatus includes an acquisition unit configured to acquire a plurality of captured images of a target object imaged under a plurality of different conditions, a first calculation unit configured to calculate a first reflection characteristic of the target object for each pixel position of the captured images using a first spatial resolution based on the captured images, a determination unit configured to determine whether an angular resolution of the calculated first reflection characteristic is lower than a first threshold value, and a second calculation unit configured to calculate a second reflection characteristic of the target object using a second spatial resolution lower than the first spatial resolution based on the calculated first reflection characteristic in a case where the angular resolution is lower than the first threshold value.

20 Claims, 14 Drawing Sheets

| x | y | a | σ | m |
|---|---|---|---|---|
| 0 | 0 | 0.81 | 0.21 | 45.00 |
| 0 | 1 | 0.72 | 0.33 | 45.01 |
| ⋮ | ⋮ | ⋮ | ⋮ | ⋮ |
| ⋮ | ⋮ | ⋮ | ⋮ | ⋮ |

*81*

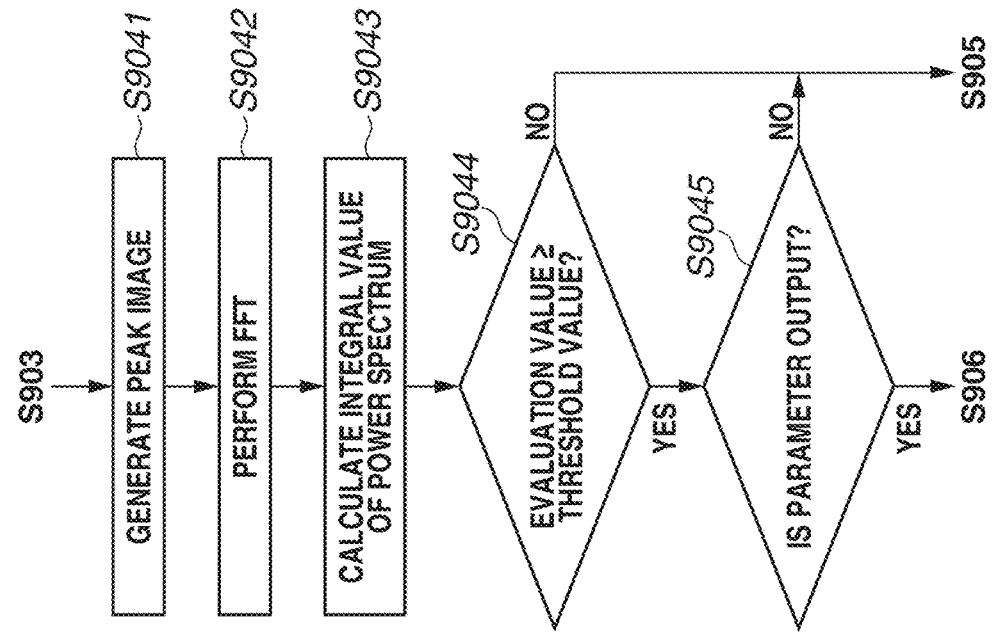
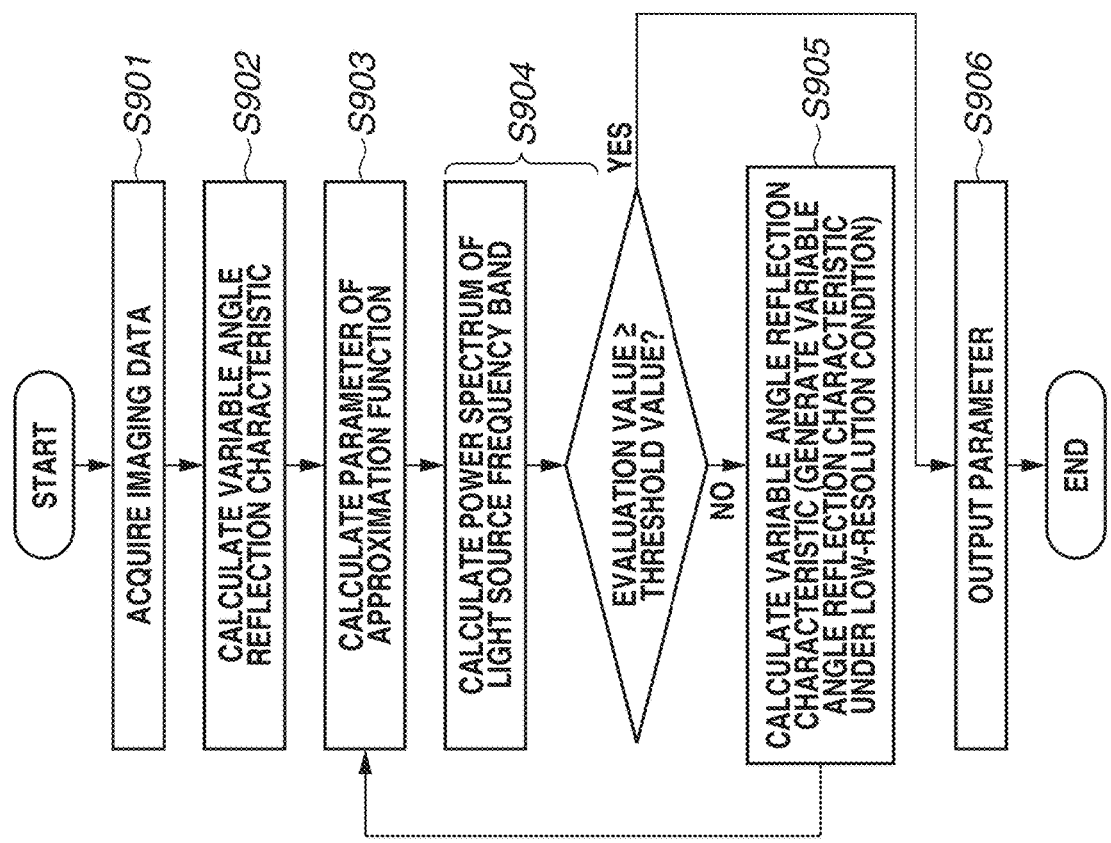

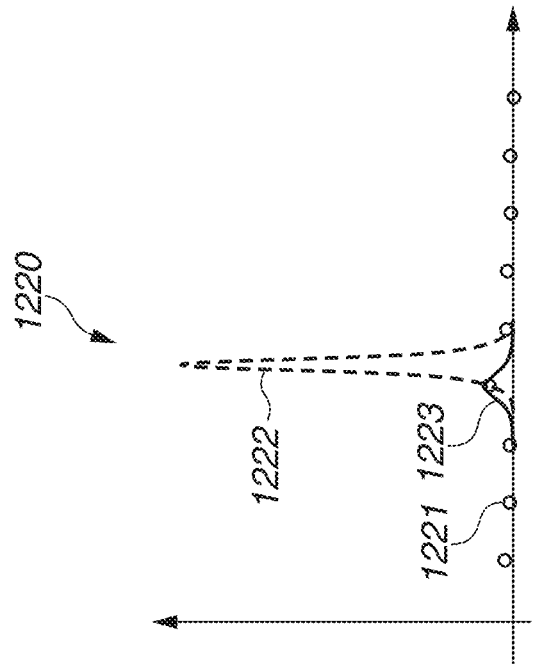
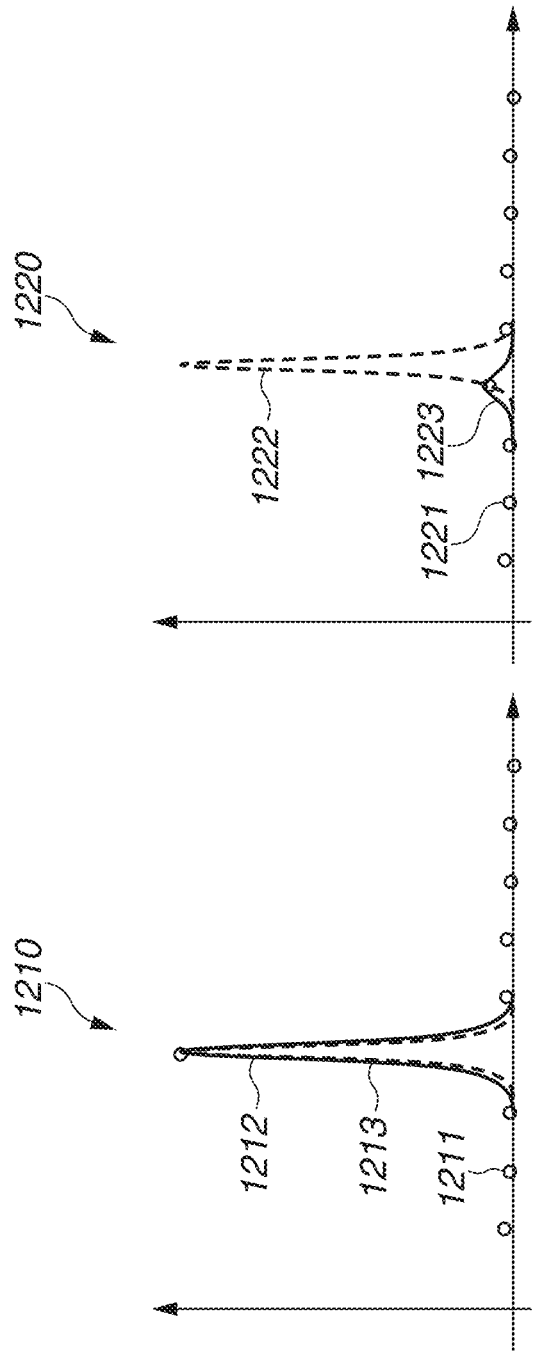

APPARATUS, METHOD, AND STORAGE MEDIUM

BACKGROUND OF THE DISCLOSURE

Field of the Disclosure

The aspect of the embodiments relates to a technique for calculating a reflection characteristic of an object.

Description of the Related Art

In the field of computer graphics (CG) representing textures of materials and coatings of objects, bidirectional reflectance distribution function (BRDF) measurement data or spatially varying bidirectional reflectance distribution function (SVBRDF) measurement data is used. The BRDF measurement data represents a variable angle reflection characteristic that varies depending on an illumination direction and an observation direction. The SVBRDF measurement data represents a two-dimensional variable angle reflection characteristic. A method of measuring a BRDF, which is a variable angle reflection characteristic, is discussed in Japanese Patent Application Laid-Open No. 2013-174464. According to Japanese Patent Application Laid-Open No. 2013-174464, in receiving (measuring) a change in a geometric condition and reflected light from a target object under the geometric condition, a geometric condition for next measurement is derived based on previously-measured data.

However, since a geometric condition is generally controlled by changing the position of a light reception device or a light source, an angular resolution has an upper limit based on a hardware configuration. This sometimes makes it difficult to obtain a desired variable angle reflection characteristic.

SUMMARY OF THE DISCLOSURE

According to an aspect of the embodiments, an apparatus includes an acquisition unit configured to acquire a plurality of captured images of a target object imaged under a plurality of different conditions, a first calculation unit configured to calculate a first reflection characteristic of the target object for each pixel position of the captured images using a first spatial resolution based on the captured images, a determination unit configured to determine whether an angular resolution of the calculated first reflection characteristic is lower than a first threshold value, and a second calculation unit configured to calculate a second reflection characteristic of the target object using a second spatial resolution lower than the first spatial resolution based on the calculated first reflection characteristic in a case where the angular resolution is lower than the first threshold value.

Further features of the disclosure will become apparent from the following description of exemplary embodiments with reference to the attached drawings.

BRIEF DESCRIPTION OF THE DRAWINGS

FIGS. 9A and 9B are flowcharts illustrating a process that is executed by an image processing apparatus.

FIGS. 12A and 12B are diagrams illustrating an example of measurement points that vary depending on coordinates.

DESCRIPTION OF THE EMBODIMENTS

Figure 1:
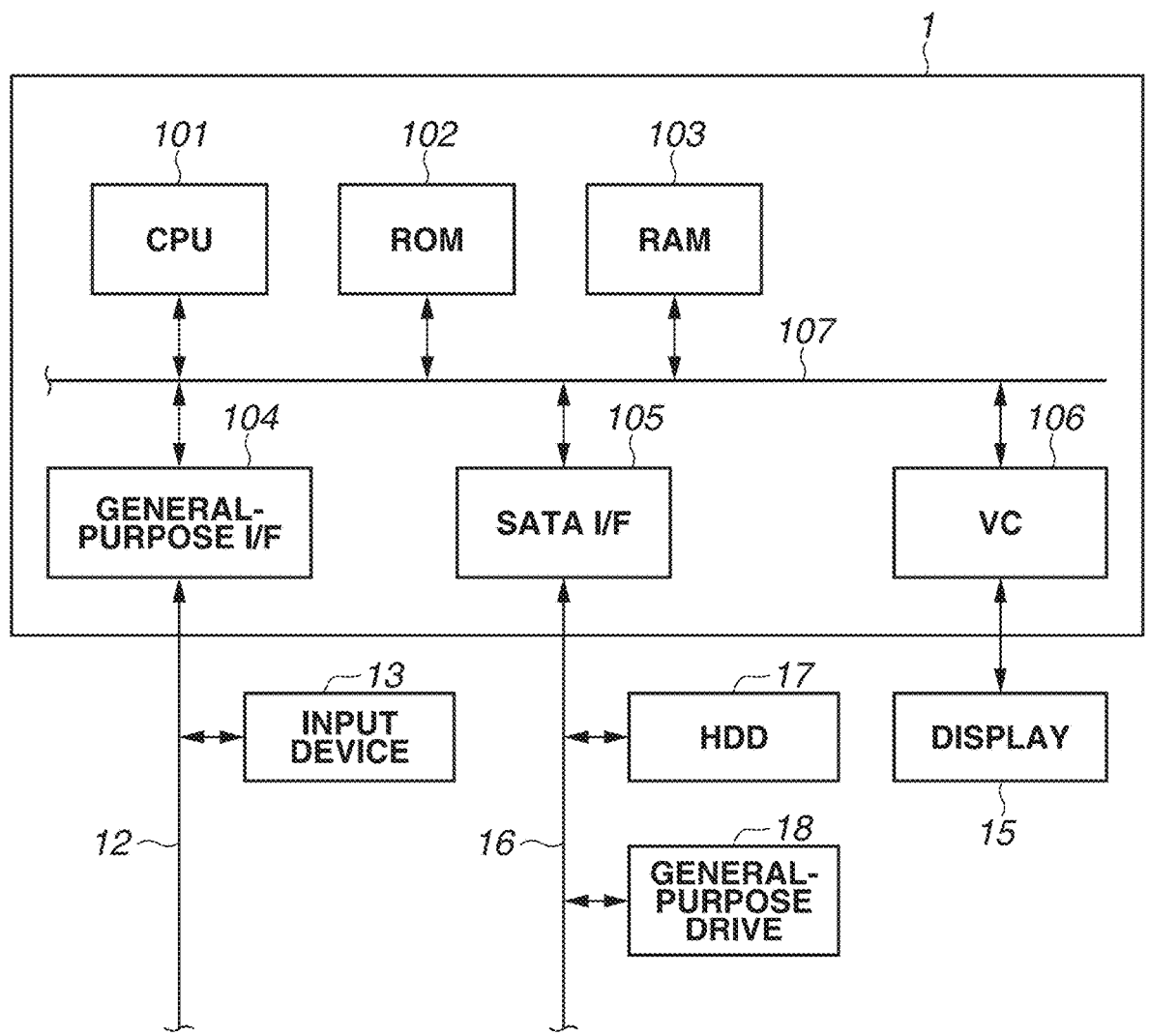
FIG. 1 is a block diagram illustrating an example of a hardware configuration of an image processing apparatus.

Various exemplary embodiments of the disclosure will be described below with reference to the drawings. It should be noted that each component described in the exemplary embodiments is a mere example and is not intended to limit the scope of the disclosure. Further, not all combinations of components described in the exemplary embodiments are essential to the technical solution, and various modifications and changes are possible. In the drawings, similar portions or elements are given the same reference numeral, and redundant descriptions are omitted.

A form of adaptively controlling a spatial resolution and an angular resolution and deriving a variable angle reflection characteristic at different coordinates according to a first exemplary embodiment will be described below.

<Hardware Configuration of Image Processing Apparatus>

FIG. 1 is a block diagram illustrating an example of a hardware configuration of an image processing apparatus 1 according to the present exemplary embodiment. The image processing apparatus 1 consists of, for example, a computer. The image processing apparatus 1 includes a central processing unit (CPU) 101, a read-only memory (ROM) 102, a random access memory (RAM) 103, a general-purpose interface (general-purpose I/F) 104, a serial advanced technology attachment (SATA) interface (SATA I/F) 105, and a video card (VC) 106. The foregoing components are connected to a system bus 107 via which data is transmitted and received to and from one another.

The CPU 101 executes an operating system (OS) and various programs stored in the ROM 102 or a hard disk drive (HDD) 17 using the RAM 103 as a working memory. Further, the CPU 101 controls the components via the system bus 107. The CPU 101 loads a program stored in the ROM 102 or the HDD 17 to the RAM 103 and executes the loaded program to perform a process illustrated in a flowchart described below.

The general-purpose I/F 104 is a serial bus interface such as a universal serial bus (USB) interface and is connected to an input device 13 such as a mouse and a keyboard via a serial bus 12. The SATA I/F 105 is a serial bus interface and is connected to the HDD 17 and a general-purpose drive 18, which reads from and writes to various recording mediums, via a serial bus 16. The CPU 101 uses the HDD 17 and various recording mediums attached to the general-purpose drive 18 as various data storage locations.

The VC 106 is a video interface and is connected to a display 15. The CPU 101 displays a user interface (UI) provided by a program on the display 15 and receives input such as a user instruction received via the input device 13.

<Functional Configuration of Image Processing Apparatus>

Figure 2:
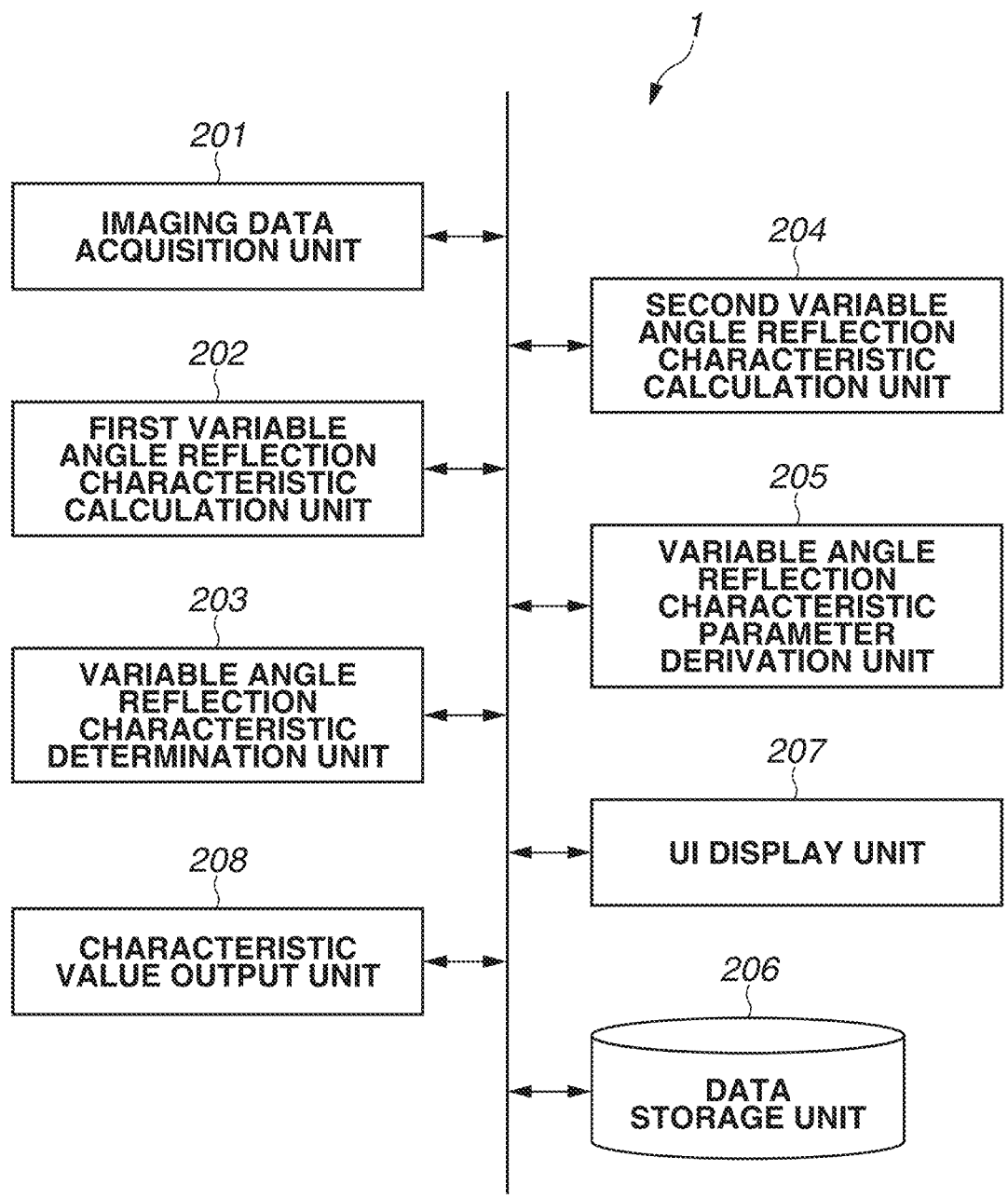
FIG. 2 is a block diagram illustrating an example of a functional configuration of an image processing apparatus.

FIG. 2 is a block diagram illustrating an example of a functional configuration of the image processing apparatus 1. The CPU 101 reads a program stored in the ROM 102 or the HDD 17 and executes the read program using the RAM 103 as a work memory to function as a functional component illustrated in FIG. 2. Not all processes described below have to be executed by the CPU 101, and the image processing apparatus 1 can be configured so that the processes are partially or entirely performed by a single processing circuit or a plurality of processing circuits other than the CPU 101.

The image processing apparatus 1 includes a imaging data acquisition unit 201, a first variable angle reflection characteristic calculation unit 202, a variable angle reflection characteristic determination unit 203, a second variable angle reflection characteristic calculation unit 204, a variable angle reflection characteristic parameter derivation unit 205, a data storage unit 206, a UI display unit 207, and a characteristic value output unit 208.

The imaging data acquisition unit 201 acquires imaging data (a plurality of captured images and an image capturing geometric condition) specified via the general-purpose I/F 104. The first variable angle reflection characteristic calculation unit 202 calculates a reflection intensity under a plurality of different angle conditions as a measurement point of a variable angle reflection characteristic for each coordinate position of a sample (image capturing target object) based on the imaging data. The variable angle reflection characteristic determination unit 203 determines whether the number of obtained measurement points is sufficient for the variable angle reflection characteristic to reproduce specular reflection accurately.

The second variable angle reflection characteristic calculation unit 204 combines at least a variable angle reflection characteristic of a pixel for which the variable angle reflection characteristic determination unit 203 determines that the number of obtained measurement points is insufficient, with a variable angle reflection characteristic of a neighboring pixel and calculates a new variable angle reflection characteristic. The variable angle reflection characteristic parameter derivation unit 205 derives a variable angle reflection characteristic parameter for approximating a variable angle reflection characteristic by a predetermined function.

The data storage unit 206 consists of the HDD 17 and various recording mediums mounted on the general-purpose drive 18 and stores captured images or information such as variable angle reflection characteristics calculated by the first and second variable angle reflection characteristic calculation units 202 and 204. The UI display unit 207 displays information for use in acquiring imaging data and a UI for prompting user input, such as execution of processing, on the display 15. The characteristic value output unit 208 outputs the variable angle reflection characteristic parameter in a designated form. Details of control operations of the components will be described below.

<Operations of Image Processing Apparatus>

Figure 3:
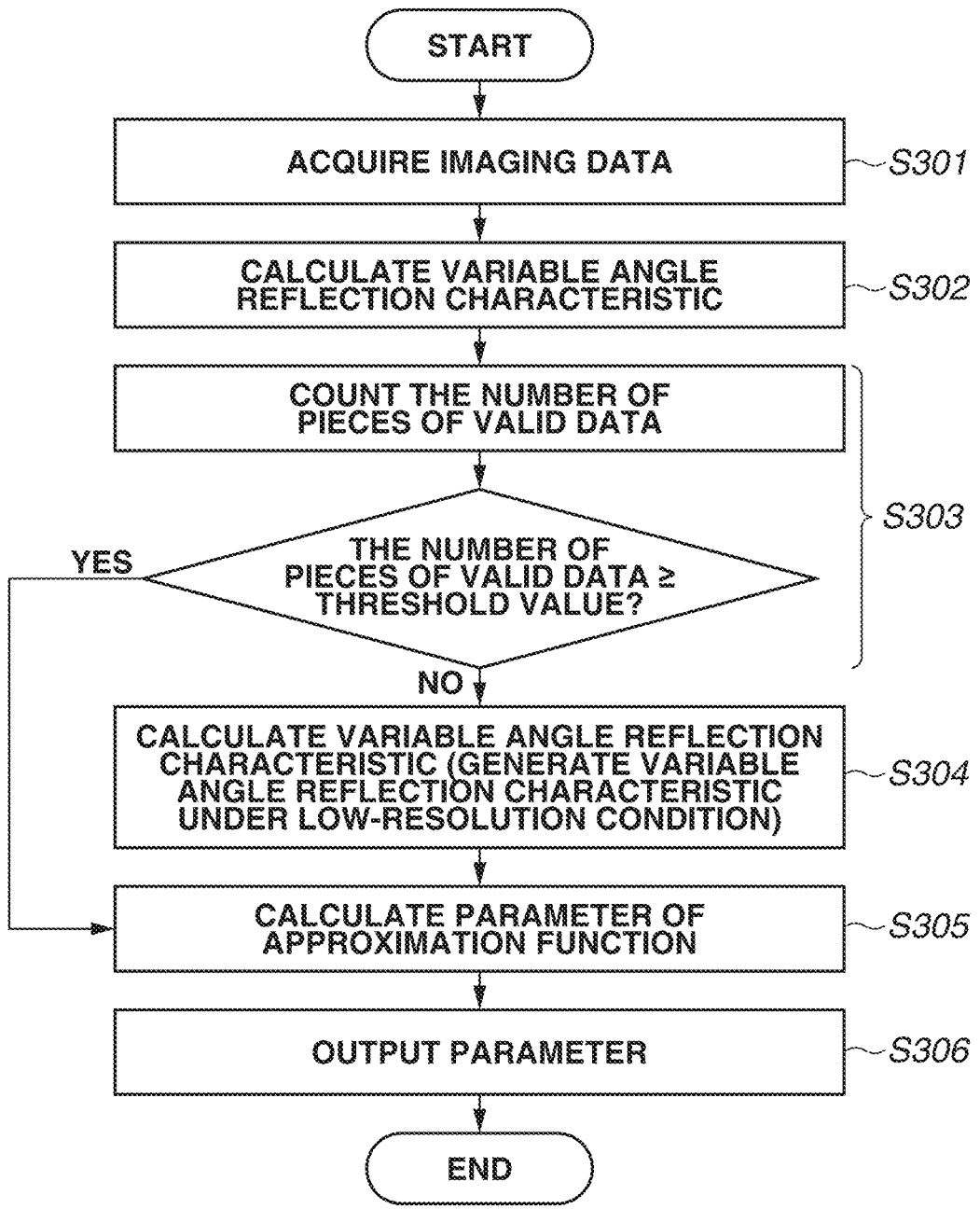
FIG. 3 is a flowchart illustrating a process that is executed by an image processing apparatus.

FIG. 3 is a flowchart illustrating an image processing method by the image processing apparatus 1 according to the present exemplary embodiment. Details of the processing by the image processing apparatus 1 according to the present exemplary embodiment will be described below with reference to FIG. 3. The CPU 101 loads a program stored in the ROM 102 to the RAM 103 and executes the loaded program to execute the process illustrated in the flowchart in FIG. 3. Further, the process illustrated in the flowchart in FIG. 3 is started in a case where a user operates the input device 13 and inputs an instruction and the CPU 101 receives the input instruction. The letter "S" in the following description of the flowchart refers to "step". The same applies to the description of flowcharts below.

In step S301, the imaging data acquisition unit 201 acquires a plurality of pieces of imaging data on a target object (sample) imaged under a plurality of different conditions from the data storage unit 206. Specifically, the imaging data acquisition unit 201 acquires a plurality of pieces of imaging data captured at a projection angle from a plurality of different light sources to the target object. The imaging data contains a plurality of captured images and information indicating a light source, a sample, and an illumination position for deriving the projection angle and the like of the light source for each pixel of each captured image. The imaging data is recorded in advance in the data storage unit 206. The imaging data is specified by the user via the input device 13.

Figure 4:
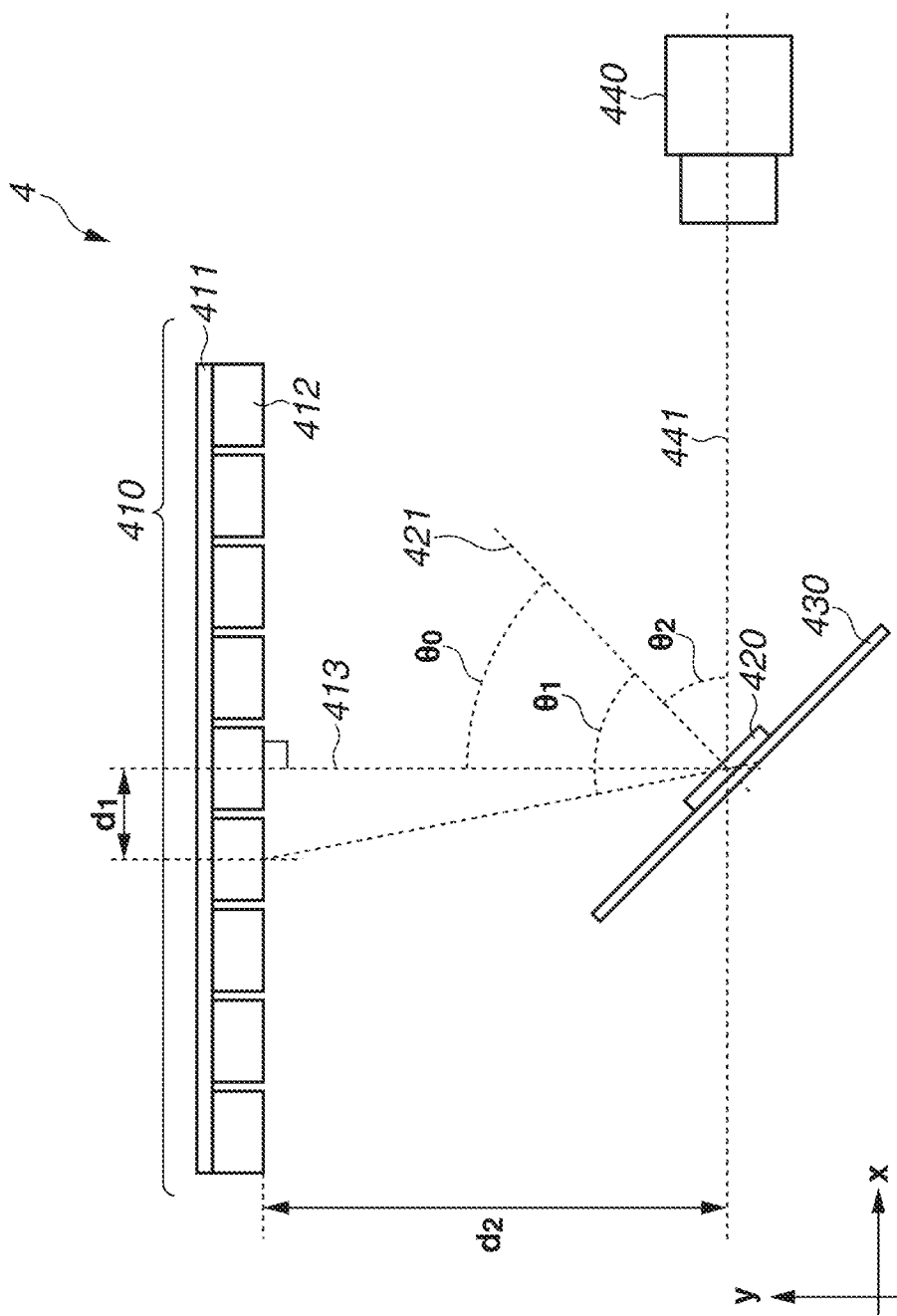
FIG. 4 is a schematic diagram illustrating a geometric condition for image capturing by an acquisition apparatus.

An example of a method of acquiring a captured image group recorded in the data storage unit 206 will be described below with reference to FIG. 4. FIG. 4 is a diagram schematically illustrating an example of a configuration of an acquisition apparatus 4 configured to acquire a captured image. First, the configuration of the acquisition apparatus 4 will be described below. An illumination device 410 includes a plurality of light sources 412 arranged at regular intervals on a control substrate 411. Each light source 412 can be controlled singly to be turned on and off. The light sources 412 are a non-telecentric optical system and have different directional characteristics for different directions. For example, the light sources 412 are light emitting diodes (LEDs) with a half-value angle of 60 degrees, and nine-by-nine LEDs 412 are arranged on the control substrate 411. An axis 413 is an axis that is perpendicular to an arrangement surface of the illumination device 410 and passes through a center of the arrangement surface. The arrangement surface is a surface on which the LEDs 412 are arranged. A central axis (the brightest portion) of each LED 412 is along a direction perpendicular to the arrangement surface on which the LEDs 412 are arranged. A sample 420 indicates a sample placed on a sample stand 430. An axis 421 is an axis that is perpendicular to a surface of the sample 420 and passes through a center of the surface of the sample 420. An image capturing apparatus 440 includes a one-band monochrome camera including a charge-coupled device (CCD) image sensor and includes a telecentric optical system including a telecentric lens with a tilt mechanism, and the image capturing apparatus 440 generates a captured image of the sample 420 by photoelectric conversion. Thus, each pixel of the CCD image sensor receives only the light in a direction parallel to an optical axis 441 of the image capturing apparatus 440. The axes 413 and 421 and the optical axis 441 are on the same plane. Orientations of the image capturing apparatus 440 and the illumination device 410 are set so that an angle $\theta_0$ formed by the axes 413 and 421 and an angle $\theta_2$ formed by the axis 421 and the optical axis 441 are equal to each other. The angles $\theta_0$ and $\theta_2$ are each 45 degrees, and the optical axis 441 passes through a central pixel of the CCD image sensor of the image capturing apparatus 440. For simplification of description, hereinafter, an operation of the acquisition apparatus 4 on a two-dimensional plane and processing of a captured image acquired by the acquisition apparatus 4 will be described below. Further, each pixel value of the captured image acquired by the image capturing apparatus 440 is linear with respect to a radiance value of light received by the CCD image sensor.

Next, a process of acquiring a captured image using the acquisition apparatus 4 will be described below. The illumination device 410 turns on one of the light sources 412. The image capturing apparatus 440 captures an image of the sample 420 illuminated by the light source 412 that is turned on, and the image capturing apparatus 440 generates a captured image. Thereafter, the illumination device 410 turns off the light source 412. The acquisition apparatus 4 sequentially executes the above-described series of control processes while turning on different light sources 412. Consequently, the image capturing apparatus 440 records a reflected light distribution from the sample 420 as a captured image for each of a plurality of different projection angles $\theta_1$. The recorded image is a tagged image file format (TIFF) grayscale image, and each pixel value is a value normalized to 16 bits (0 to 65535). The captured images are of the same region of the sample 420, and pixel values of the same coordinates are considered as pixel values obtained by receiving reflected light from the same position on the sample 420. According to the present exemplary embodiment, the acquisition apparatus 4 acquires a captured image group of the target object imaged by the above-described process and acquires a captured image group of a standard reflector imaged by a process similar to the process by which the target object is imaged. The sample 420 is the target object or the standard reflector. The captured image group of the standard reflector are used as calibration data for correcting a difference in the distance from each light source 412 to a subject or a difference in incident illuminance to the target object due to an orientation characteristic of the light source 412. A variable angle reflection characteristic of the standard reflector is known, and for simplification of description, the standard reflector according to the present exemplary embodiment is described as a perfect diffuse reflector having a constant reflection characteristic regardless of a direction.

The imaging data acquisition unit 201 acquires the captured images. Further, in order to calculate each projection angle $\theta_1$, the imaging data acquisition unit 201 acquires a distance $d_1$ from the axis 413 to the light source 412, a distance $d_2$ from the light source 412 to the sample 420 on the axis 413, an angle $\theta_2$ formed by the axis 421 and the optical axis 441 as a light reception angle, and a resolution of the image capturing apparatus 440. Each light source 412 is given an identification number i in advance. A captured image acquired by turning on a light source i and the distance $d_1$ indicating the position of the light source i can be associated with each other by the identification number i.

Figure 5A:
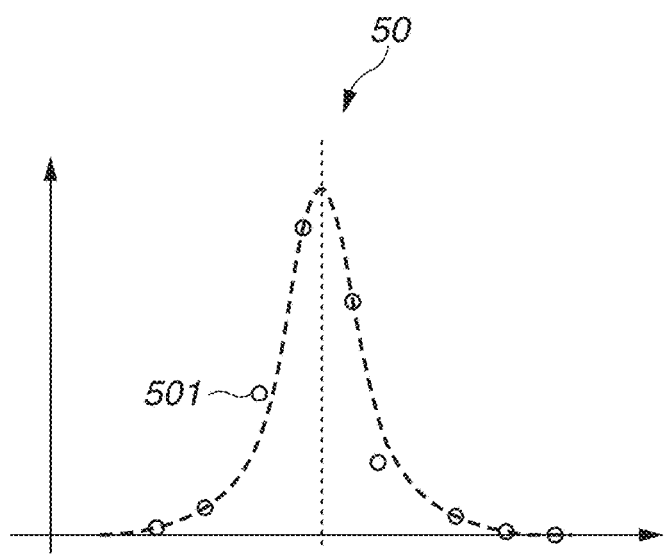
FIGS. 5A and 5B are diagrams illustrating an example of data representing a variable angle reflection characteristic.
Figure 5B:
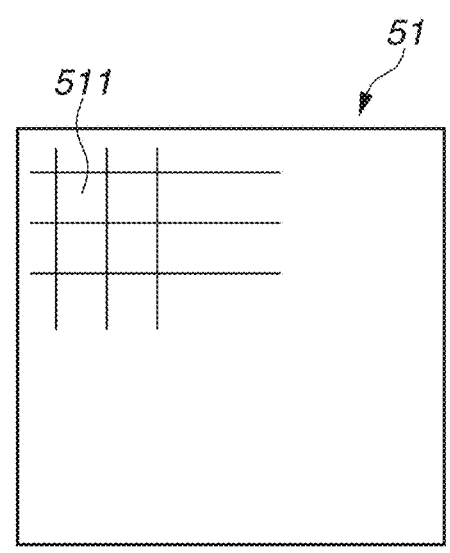
Figure 6:
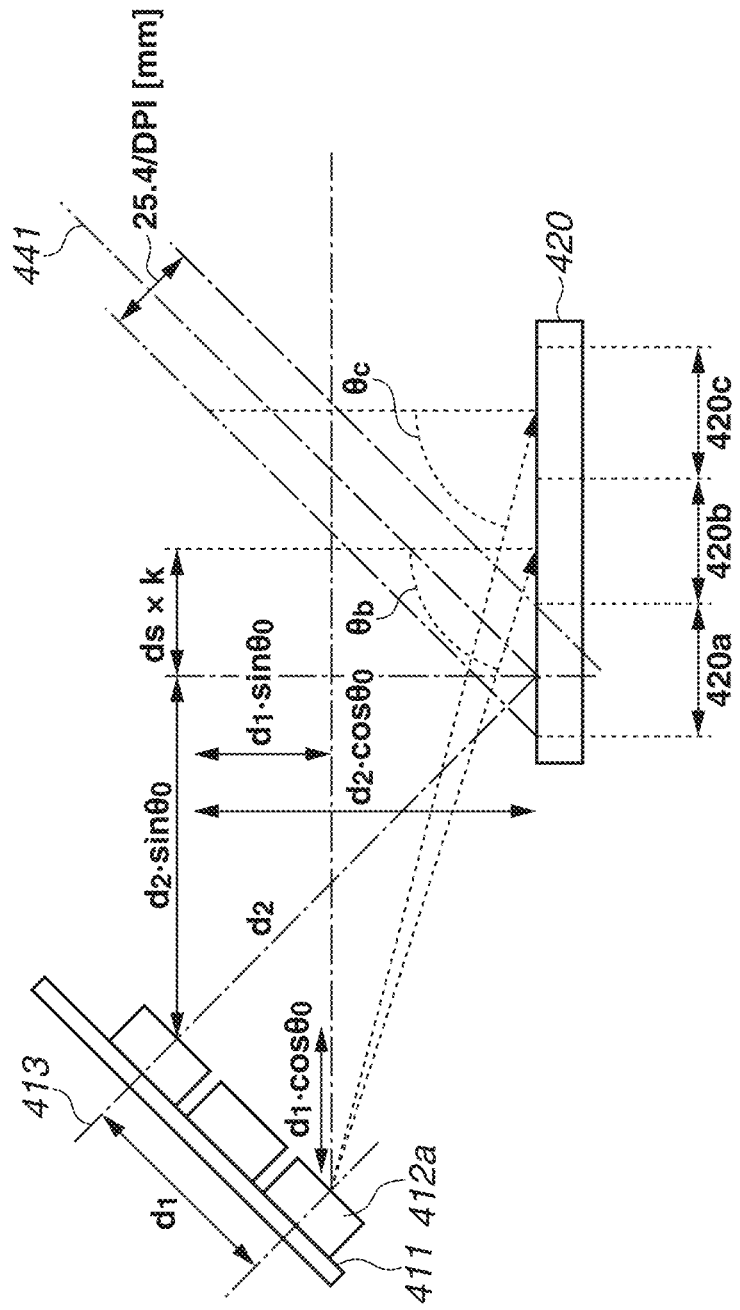
FIG. 6 is a schematic diagram illustrating a difference in projection angle depending on coordinates.
Figure 7A:
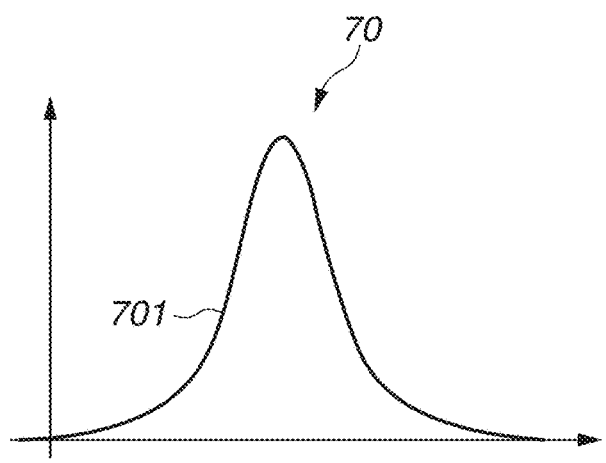
FIGS. 7A, 7B, 7C, and 7D are diagrams illustrating an example of an insufficient angular resolution.
Figure 7C:
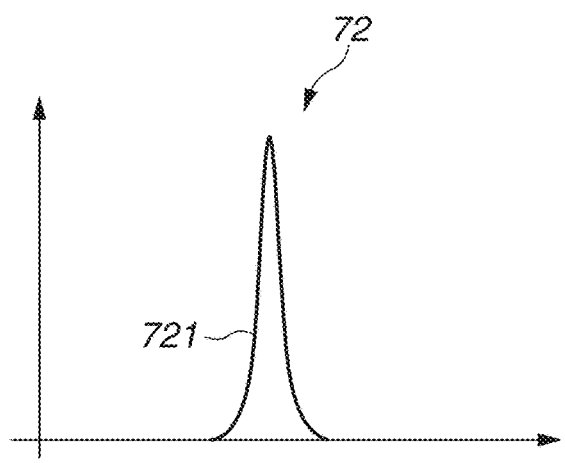
Figure 7B:
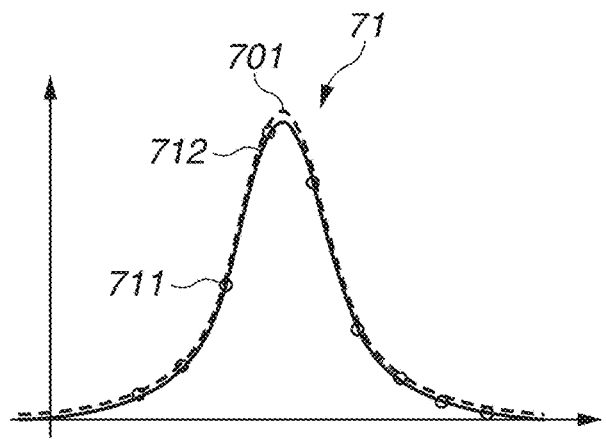
Figure 7D:
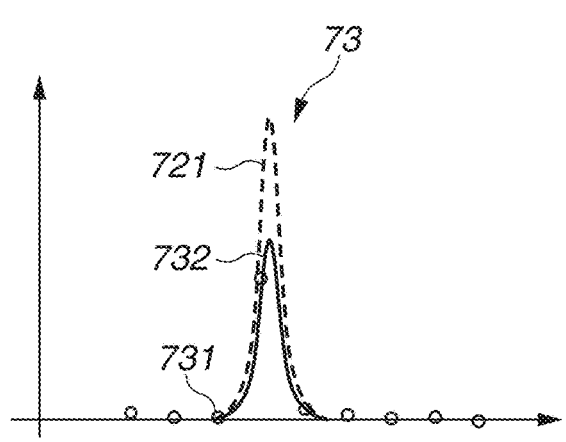

In step S302, the first variable angle reflection characteristic calculation unit 202 calculates a variable angle reflection characteristic of the target object for each pixel position of the captured images at a first spatial resolution based on the imaging data. Measurement points 501 of a variable angle reflection characteristic 50 of the target object to be calculated will be described below with reference to FIGS. 5A and 5B. The horizontal axis of the variable angle reflection characteristic 50 is the projection angle $\theta_1$. The vertical axis of the variable angle reflection characteristic 50 is the reflection intensity of the target object corrected by the standard reflector. The variable angle reflection characteristic 50 includes the plottable measurement points 501. The first variable angle reflection characteristic calculation unit 202 calculates the measurement points 501 of the variable angle reflection characteristic 50 for each pixel 511 of imaging data 51 acquired in step S301. A method of calculating the projection angle $\theta_1$ will specifically be described below with reference to FIG. 6. FIG. 6 illustrates a portion of the configuration of the acquisition apparatus 4 illustrated in FIG. 4, and similar components are given the same reference numeral. Regions 420a, 420b, and 420c are regions formed by dividing the target object (sample) 420 based on the resolution of the image capturing apparatus 440. Each of the regions 420a, 420b, and 420c corresponds to one pixel in the captured image. For example, a length $d_s$ (mm) of each of the regions 420a, 420b, and 420c is uniformly calculated by formula (1).

$$d_s = \frac{25.4}{DPI} \times \frac{1}{\sin\theta_1}. \tag{1}$$

In formula (1), DPI is the spatial resolution of the image capturing apparatus 440 and indicates the number of pixels (dots per inch) in a one-inch width. A projection angle $\theta_b$ indicates the projection angle $\theta_1$ from the light source 412a to the region 420b. A projection angle $\theta_c$ indicates the projection angle $\theta_1$ from the light source 412a to the region 420c. As described above, the projection angle $\theta_1$ becomes the different projection angles $\theta_b$ and $\theta_c$ for the different regions 420b and 420c. The projection angle $\theta_1$ is calculated by formula (2).

$$\theta_1 = \tan^{-1}\left(\frac{d_2 \times \sin\theta_0 + d_1 \times \cos\theta_0 + d_s \times k}{d_2 \times \cos\theta_0 - d_1 \times \sin\theta_0}\right). \tag{2}$$

In formula (2), $d_s$ is the length (mm) of one pixel of the above-described captured image, and k is the number of pixels from a pixel (central pixel of the captured image) on the axis 413 to a target pixel. According to formula (2), for example, in a case where $d_2$ is 30 mm and $d_1$ is 0 mm (the light source 412 on the axis 413 is turned on), the projection angle $\theta_1$ to the region 420a on the axis 413 is 45.00 degrees, and the projection angle $\theta_1$ to the adjacent region 420b is 45.11 degrees. The first variable angle reflection characteristic calculation unit 202 calculates the projection angle $\theta_1$ corresponding to the pixel position. In a case where the pitch of the light sources 412 is 1 mm and the adjacent light source 412 illuminates the region 420a, the projection angle $\theta_1$ is calculated to be 46.91 based on formula (2). In a case where the light sources 412 have a standard size and the image capturing apparatus 440 has a standard resolution as described above, the difference in the projection angle $\theta_1$ between adjacent pixels is significantly smaller than the difference in the projection angle $\theta_1$ between the adjacent light source positions.

Next, a reflection intensity calculation method will be specifically described below. A reflection intensity $I_i(x, y)$ is calculated using formula (3).

$$I_i(x, y) = c \times \frac{S_i(x, y)}{R_i(x, y)} \tag{3}$$

In formula (3), $S_i(x, y)$ is the pixel value of the coordinate position (x, y) on a captured image $S_i$ of the target object captured by turning on the light source i, and $R_i(x, y)$ is the pixel value of the coordinate position (x, y) on a captured image $R_i$ of the perfect diffuse reflector captured by turning on the light source i.

In formula (3), c is a fixed value. In a case where the standard reflector is not a perfect diffuse reflector and has different characteristics for different angles, the reciprocal number of the reflectance for each angle is multiplied instead of the value c. Further, in a case where each image capturing pixel value is not linear to a luminance value, formula (3) is applied using a pixel value on which gamma correction or conversion by referring to a one-dimensional lookup table (one-dimensional LUT) is performed in advance. By the foregoing processing, the first variable angle reflection characteristic calculation unit 202 acquires the projection angle $\theta_1$ and the reflection intensity $I_i(x, y)$ for each pixel in each captured image. In this way, the first variable angle reflection characteristic calculation unit 202 calculates the measurement points 501 of the variable angle reflection characteristic 50 of a desired pixel position as illustrated in FIG. 5A.

In step S303, the variable angle reflection characteristic determination unit 203 determines whether an angular resolution of the variable angle reflection characteristic 50 calculated in step S302 is lower than a threshold value. Specifically, the variable angle reflection characteristic determination unit 203 counts the number of pieces of valid data on the variable angle reflection characteristic 50 calculated in step S302 and determines whether the number of pieces of valid data on the variable angle reflection characteristic 50 is greater than or equal to a threshold value.

The number of pieces of valid data will be described below with reference to FIGS. 7A to 7D. A graph 70 is a curve representing a true variable angle reflection characteristic 701 of a region corresponding to a pixel of a target object. In general, a peak of the reflection intensity of the variable angle reflection characteristic 701 is detected near the projection angle $\theta_1$ ($\theta_1 = \theta_2$) equal to the light reception angle $\theta_2$. The peak value represents the brightness of an illumination image of the target object. The half-width of the curve of the variable angle reflection characteristic 701 represents the clarity of the illumination image reflected in the target object. A sample with a sharp reflected illumination image is referred to herein as "a sample with high image clarity".

Measurement data on a variable angle reflection characteristic corresponds to a measurement point (plotting point) 711 on a graph 71 and is the same in number as light sources 412 that are turned on. A variable angle reflection characteristic 712 is a function curve approximated based on the measurement points 711 of the variable angle reflection characteristic and is defined by the variable angle reflection characteristic parameter derivation unit 205 described below. A neighborhood of a peak of the variable angle reflection characteristic 712 will be referred to as "specular reflection component", and in a case where many measurement points 711 are obtained at the specular reflection component, the true variable angle reflection characteristic 701 is approximated to a function with great accuracy.

A graph 72 is a curve representing a true variable angle reflection characteristic 721 of a region corresponding to a pixel of the target object. The variable angle reflection characteristic 721 is a variable angle reflection characteristic with high image clarity and a small half-width. In a graph 73, a variable angle reflection characteristic 732 is a function curve approximated based on measurement points 731 of a variable angle reflection characteristic. As indicated by the graph 73, a sufficient number of measurement points 731 are not obtained at the specular reflection component, and the accuracy of function approximation decreases significantly.

The number of pieces of valid data refers to the number of measurement points at the specular reflection component. In order to detect the number of pieces of valid data, in step S303, the variable angle reflection characteristic determination unit 203 first detects maximum and minimum values of the variable angle reflection characteristic 50 for each pixel position and calculates the average value of the detected maximum and minimum values. Then, the variable angle reflection characteristic determination unit 203 determines whether the number of measurement points (valid data) having a reflection intensity higher than or equal to the average value is greater than or equal to a threshold value. In the present exemplary embodiment, a measurement point having a reflection intensity higher than or equal to the average value is considered as a measurement point of the specular reflection component.

In a case where the number of pieces of data having a reflection intensity higher than or equal to a second threshold value among the variable angle reflection characteristic data (measurement points) is greater than or equal to a third threshold value, the variable angle reflection characteristic determination unit 203 determines that the angular resolution of the variable angle reflection characteristic is higher than or equal to a first threshold value. Further, in a case where the number of pieces of data having a reflection intensity higher than or equal to the second threshold value among the variable angle reflection characteristic data (measurement points) is less than the third threshold value, the variable angle reflection characteristic determination unit 203 determines that the angular resolution of the variable angle reflection characteristic is lower than the first threshold value.

As described above, the number of measurement points is determined based on the number of captured images, i.e., the number of light sources, and the interval (angular resolution) of the light reception angle $\theta_2$ is determined based on the pitch of the light sources 412 and the distance between the light sources 412 and the target object. A cause of the insufficient number of pieces of valid data of the measurement points 731 as indicated by the graph 73 is an insufficient angular resolution, and hereinafter, an insufficient number of pieces of valid data is synonymous with an insufficient angular resolution.

In a case where the number of pieces of valid data on the variable angle reflection characteristic 50 calculated in step S302 is greater than or equal to the threshold value, the variable angle reflection characteristic determination unit 203 determines that the angular resolution of the variable angle reflection characteristic 50 is higher than or equal to the threshold value (YES in step S303), and the processing proceeds to step S305. Further, in a case where the number of pieces of valid data on the variable angle reflection characteristic 50 calculated in step S302 is less than the threshold value, the variable angle reflection characteristic determination unit 203 determines that the angular resolution of the variable angle reflection characteristic 50 is lower than the threshold value (NO in step S303), and the processing proceeds to step S304.

In step S305, the variable angle reflection characteristic parameter derivation unit 205 derives parameters of a function $f_{x,y}(\theta_1)$ that approximates the measurement points of the variable angle reflection characteristic calculated by the first variable angle reflection characteristic calculation unit 202, and the processing proceeds to step S306. The function $f_{x,y}(\theta_1)$ is defined by formula (4).

$$f_{x,y}(\theta_1) = \frac{\alpha_{x,y}}{\sqrt{2\pi\sigma_{x,y}^2}} \times \exp\left(-\frac{(\theta_1 - m_{x,y})^2}{2\sigma_{x,y}^2}\right) + D \quad (4)$$

The function $f_{x,y}(\theta_1)$ is a normal distribution function with a variance $\sigma_{x,y}$, a mean and a coefficient $a_{x,y}$ that is a weighted coefficient. D is an offset amount indicating a diffuse reflection component. The parameters of the function $f_{x,y}(\theta_1)$ are the coefficient $a_{x,y}$, the variance $\sigma_{x,y}$, and the mean $m_{x,y}$ and are derived by optimization processing using a publicly-known gradient descent method to minimize the cumulative squared error of the measurement points of the variable angle reflection characteristic and values estimated by formula (4). The derived curve of the function $f_{x,y}(\theta_1)$ corresponds to, for example, the variable angle reflection characteristic 701 in FIG. 7A or the variable angle reflection characteristic 721 in FIG. 7C. The parameters of the function $f_{x,y}(\theta_1)$ correspond to the parameters of the variable angle reflection characteristic 701 or 721. The function $f_{x,y}(\theta_1)$ can be a publicly-known model formula other than the normal distribution function, such as a Cook-Torrance model.

In step S304, the second variable angle reflection characteristic calculation unit 204 combines together the measurement points of the plurality of variable angle reflection characteristics of the neighboring pixel positions that are calculated by the first variable angle reflection characteristic calculation unit 202, and calculates measurement points of a variable angle reflection characteristic of the target object using a second spatial resolution. The second spatial resolution is lower than the first spatial resolution in step S302. For example, the second variable angle reflection characteristic calculation unit 204 combines the variable angle reflection characteristics of two-by-two neighboring pixels together and calculates measurement points of a new variable angle reflection characteristic. Consequently, the number of measurement points of the variable angle reflection characteristic is increased fourfold. As described above with reference to FIG. 6, each measurement point has a different projection angle $\theta_1$ and thus has a high angular resolution. This increases the possibility that the true variable angle reflection characteristic (especially the specular reflection component) of the target object is approximated with greater accuracy using a function curve derived by the variable angle reflection characteristic parameter derivation unit 205 described below. The spatial resolution of the measurement points of the variable angle reflection characteristic calculated by the second variable angle reflection characteristic calculation unit 204 with respect to the target object surface is reduced to ½ compared to that of the measurement points of the variable angle reflection characteristic calculated by the first variable angle reflection characteristic calculation unit 202. Thereafter, the processing proceeds to step S305.

In step S305, the variable angle reflection characteristic parameter derivation unit 205 derives the parameters of the function $f_{x,y}(\theta_1)$ approximating the measurement points of the variable angle reflection characteristic calculated by the second variable angle reflection characteristic calculation unit 204 as expressed by formula (4) specified above. The parameters of the function $f_{x,y}(\theta_1)$ correspond to the parameters of the variable angle reflection characteristic 701 or 721. Thereafter, the processing proceeds to step S306.

Figures 8A, 8B:
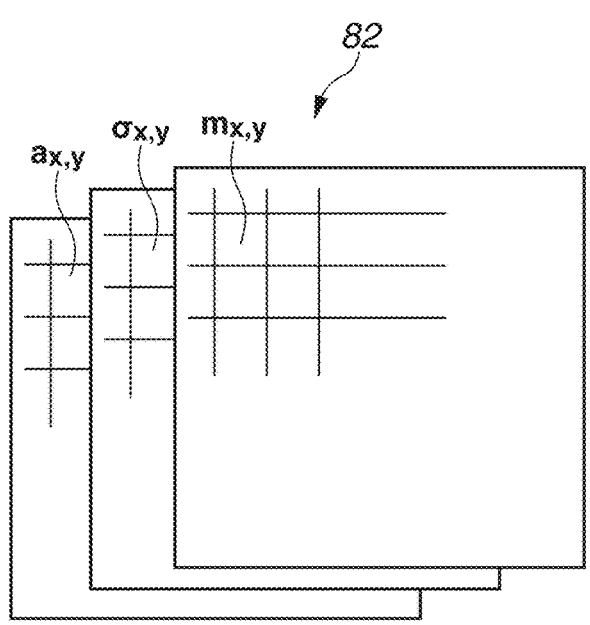
FIGS. 8A and 8B are diagrams illustrating data that is output as a result of a series of processes.

In step S306, the characteristic value output unit 208 outputs the parameters of the function $f_{x,y}(\theta_1)$. A form of a parameter 81 of the function $f_{x,y}(\theta_1)$ will be described below with reference to FIGS. 8A and 8B. The parameter 81 of the function $f_{x,y}(\theta_1)$ associates coordinate positions x and y of the target object with the parameters of the function $f_{x,y}(\theta_1)$ at the corresponding coordinate positions x and y. The parameters of the function $f_{x,y}(\theta_1)$ are the coefficient $a_{x,y}$, the variance $\sigma_{x,y}$, and the mean $m_{x,y}$.

A parameter 82 of the function $f_{x,y}(\theta_1)$ is image data storing the coefficient $a_{x,y}$, the variance $\sigma_{x,y}$, and the mean $m_{x,y}$ as pixel values in the pixel at the corresponding coordinates x and y. Hereinafter, the image data will be referred to as "parameter image". For example, the characteristic value output unit 208 stores the parameter 81 of the function $f_{x,y}(\theta_1)$ in a comma separated value (csv) format and stores the parameter 82 of the function $f_{x,y}(\theta_1)$ as a TIFF grayscale image. Three TIFF images corresponding to the coefficient $a_{x,y}$, the variance $\sigma_{x,y}$, and the mean $m_{x,y}$ are generated. The parameters stored in the images are normalized for each image so that the maximum value is 255 and the minimum value is 0.

In step S303, in a case where it is determined that the number of pieces of valid data is less than the threshold value, the resolution of the parameter image is one-half the resolution of the captured image acquired by the imaging data acquisition unit 201, and the numbers of pixels of the parameter image in the horizontal and vertical directions are one-half the numbers of pixels of the captured image in the horizontal and vertical directions. In a case where it is determined that the number of pieces of valid data is greater than the threshold value, the resolution and the number of pixels of the parameter image are the same as those of the captured image acquired by the imaging data acquisition unit 201. The characteristic value output unit 208 stores the parameter 81 of the function $f_{x,y}(\theta_1)$ in the csv format and the parameter 82 of the function $f_{x,y}(\theta_1)$ in the TIFF format in the data storage unit 206. The UI display unit 207 displays an image of the parameter 82 of the function $f_{x,y}(\theta_1)$ simultaneously with providing a processing completion notification.

As described above, the image processing apparatus 1 according to the present exemplary embodiment calculates the number of pieces of valid data for each coordinate position to determine whether the angular resolution is insufficient. Further, in order to increase the number of pieces of valid data, the image processing apparatus 1 decreases the spatial resolution and calculates measurement points of a variable angle reflection characteristic of a region divided using a lower spatial resolution. Thus, the image processing apparatus 1 adaptively changes the angular resolution and generates data while preventing a decrease in approximation accuracy of the specular reflection component.

According to the first exemplary embodiment, the image processing apparatus 1 decreases the spatial resolution by a predetermined amount based on the number of pieces of valid data for each coordinate position to improve the angular resolution. A method of adjusting a spatial resolution based on a spatial frequency characteristic of a calculated variable angle reflection characteristic according to a second exemplary embodiment will be described below. A functional configuration of the image processing apparatus 1 according to the present exemplary embodiment is similar to that according to the first exemplary embodiment. A main difference between the present exemplary embodiment and the first exemplary embodiment is details of the process by the variable angle reflection characteristic determination unit 203. Thus, the variable angle reflection characteristic determination unit 203 will be mainly described below in the description of the processing and operation of the image processing apparatus 1 according to the present exemplary embodiment.

<Operation of Image Processing Apparatus>

FIGS. 9A and 9B are flowcharts illustrating an example of a process that is executed by the image processing apparatus 1 according to the present exemplary embodiment. Details of the processing by the image processing apparatus 1 according to the present exemplary embodiment will be described below with reference to FIGS. 9A and 9B. The CPU 101 loads a program stored in the ROM 102 to the RAM 103 and executes the loaded program to execute the processes illustrated in the flowcharts in FIGS. 9A and 9B. Further, the processes illustrated in the flowcharts in FIGS. 9A and 9B are started in a case where the user operates the input device 13 to input an instruction and the CPU 101 receives the input instruction. In each step, the UI display unit 207 displays various types of processing progress data. A UI and data to be displayed will be described below.

In step S901, the imaging data acquisition unit 201 acquires imaging data as in the first exemplary embodiment. The imaging data contains a plurality of captured images and information indicating a light source, a sample, and an illumination position for deriving the projection angle of the light source for each pixel of each captured image.

In step S902, the first variable angle reflection characteristic calculation unit 202 calculates a variable angle reflection characteristic of each pixel based on the imaging data as in the first exemplary embodiment.

In step S903, the variable angle reflection characteristic parameter derivation unit 205 derives the parameters of the function that approximates the variable angle reflection characteristic as in the first exemplary embodiment.

In step S904, the variable angle reflection characteristic determination unit 203 calculates a power spectrum of a light source frequency band and determines whether the angular resolution is insufficient. Details of the processing and operation in step S904 will be described below with reference to FIG. 9B. In a case where the angular resolution is insufficient (NO in step S904), the processing proceeds to step S905, whereas in a case where the angular resolution is not insufficient (YES in step S904), the processing proceeds to step S906.

In step S905, the second variable angle reflection characteristic calculation unit 204 combines together the plurality of variable angle reflection characteristics of the neighboring pixel positions and calculates a new variable angle reflection characteristic as in the first exemplary embodiment. Furthermore, the second variable angle reflection characteristic calculation unit 204 replaces (updates) the variable angle reflection characteristic calculated by the first variable angle reflection characteristic calculation unit 202 in step S902 with the variable angle reflection characteristic calculated by the second variable angle reflection characteristic calculation unit 204 in step S905. After step S905, the processing returns to step S903. Thus, as long as it is determined that the angular resolution is insufficient in step S904, steps S903 to S905 are iteratively executed, and the variable angle reflection characteristic is sequentially updated. The second variable angle reflection characteristic calculation unit 204 stores a counter value with an initial value of zero in the data storage unit 206, and in a case where step S905 is applied, the counter value is added to record the number n of times of application of step S905.

In step S906, the characteristic value output unit 208 generates various parameters and a parameter image that indicate the updated variable angle reflection characteristic and outputs the generated parameters and the generated parameter image as in the first exemplary embodiment. The spatial resolution of the parameter image and the numbers of pixels of the parameter image in the horizontal and vertical directions are respectively ½ⁿ the spatial resolution of the captured image acquired by the imaging data acquisition unit 201 and the numbers of pixels of the captured image in the horizontal and vertical directions, where n is the number of times step S905 is executed.

<Processing and Operation of Variable Angle Reflection Characteristic Determination Unit 203 in Step S904>

Details of step S904 by the variable angle reflection characteristic determination unit 203 will be described below with reference to FIG. 9B. FIG. 9B is a flowchart illustrating details of an example of the processing executed in step S904 in FIG. 9A.

In step S9041, the variable angle reflection characteristic determination unit 203 acquires a maximum value of a function of each coordinate defined by the parameters of the function $f_{x,y}(\theta_1)$ and generates a two-dimensional map storing the maximum value in the corresponding coordinate. The two-dimensional map will be referred to as "peak image". The number of pixels of the peak image and the spatial resolution of the peak image are calculated as in step S906 by referring to the number of pixels of the captured image acquired in step S901, the spatial resolution of the captured image, and furthermore the number n of times of application of the processing of step S905.

Figure 10:
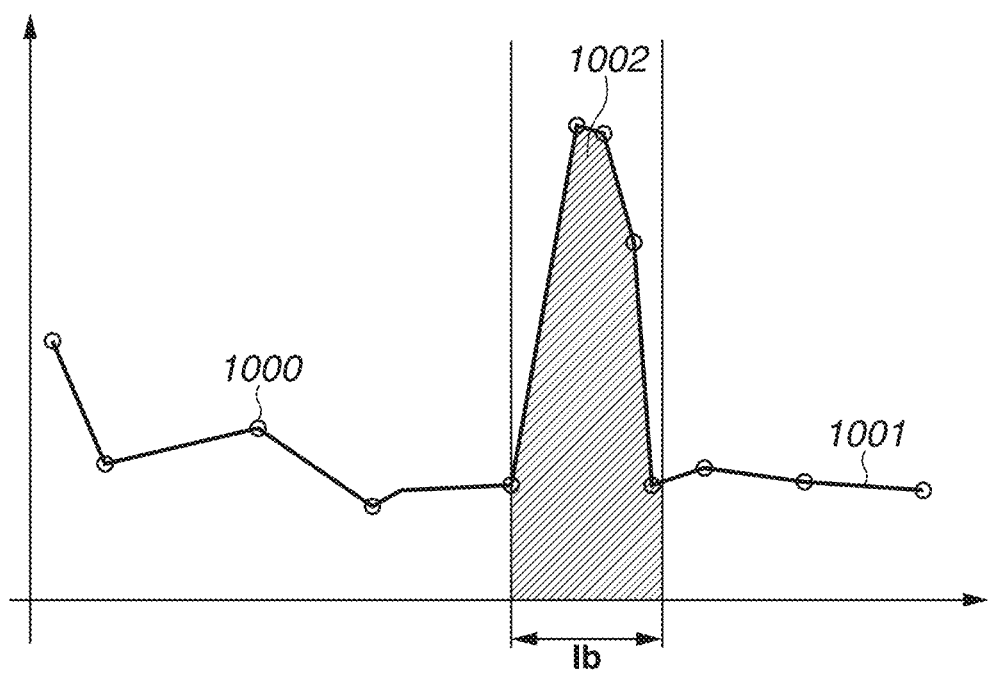
FIG. 10 is a diagram illustrating an evaluation value that is calculated.

In step S9042, the variable angle reflection characteristic determination unit 203 performs two-dimensional fast Fourier transform (FFT) processing on the peak image to transform the peak image to a frequency space and generates a FFT image. Furthermore, the variable angle reflection characteristic determination unit 203 calculates a radially averaged power spectrum (RAPS) from the FFT image. RAPS is the mean value of a power spectrum indicating the same frequency on the FFT image. FIG. 10 illustrates RAPS data. The horizontal axis is the frequency cycle per millimeter (mm), and the vertical axis is the mean value of the power spectrum. Plotting points 1000 or a graph 1001 formed by the plotting points 1000 on the horizontal and vertical axes will be referred to as "RAPS data".

In step S9043, the variable angle reflection characteristic determination unit 203 calculates an integral value of the power spectrum of the spatial frequency band of the light sources 412. The spatial frequency band of the light sources 412 herein refers to a neighborhood band of the spatial frequency of the light sources 412 that is obtained by calculating the reciprocal number of the distance between the light sources 412 that are turned on in the acquisition apparatus 4. For example, in a case where the light sources 412 that are turned on are arranged evenly at 1-mm intervals in the acquisition apparatus 4 described above with reference to FIG. 4, the spatial frequency of the light sources 412 is 1 cycle/mm According to the present exemplary embodiment, a ±0.5 cycle/mm region with the spatial frequency of the light sources 412 being the center is the spatial frequency band of the light sources 412. A region 1b in FIG. 10 indicates the spatial frequency band of the light sources 412. A shaded portion 1002 in FIG. 10 indicates an integral region of the power spectrum of the region 1b. In step S9043, the variable angle reflection characteristic determination unit 203 calculates the area of the shaded portion 1002.

Hereinafter, the integral value of the power spectrum of the region lb will be referred to as "evaluation value".

In step S9044, the variable angle reflection characteristic determination unit 203 performs determination using the evaluation value and a predetermined threshold value. In a case where the evaluation value is greater than or equal to the threshold value (YES in step S9044), the processing proceeds to step S9045, whereas in a case where the evaluation value is less than the threshold value (NO in step S9044), the processing proceeds to step S905 in FIG. 9A. Further, the processing proceeds to step S905 in FIG. 9A also in a case where the number n of times of application exceeds a predetermined value.

As described above, the variable angle reflection characteristic determination unit 203 transforms the maximum value of each coordinate of the approximation function of the variable angle reflection characteristic to the frequency space, and in a case where the integral value of the power spectrum of the first frequency band of the frequency space is greater than or equal to the fourth threshold value, the processing proceeds to step S9044. In this case, the variable angle reflection characteristic determination unit 203 determines that the angular resolution of the variable angle reflection characteristic is higher than or equal to the first threshold value. The first frequency band is a frequency band based on the spatial frequency of the light sources 412.

Further, in a case where the integral value of the power spectrum of the first frequency band is less than the fourth threshold value, the variable angle reflection characteristic determination unit 203 determines that the angular resolution of the variable angle reflection characteristic is lower than the first threshold value, and the processing proceeds to step S905.

In step S9045, the variable angle reflection characteristic determination unit 203 controls the UI display unit 207 and displays the result of step S9044. At the same time, the variable angle reflection characteristic determination unit 203 displays a UI via which an instruction as to whether to proceed to step S906 or S905 can be input, and in a case where an instruction is input, the processing proceeds to step S906 or S905 based on the input instruction. According to the present exemplary embodiment, a UI that prompts the user to input an instruction as to whether to output the parameters is displayed, and in a case where an instruction to output the parameters is received, the processing proceeds to step S906. Otherwise, the processing proceeds to step S905.

Figure 11:
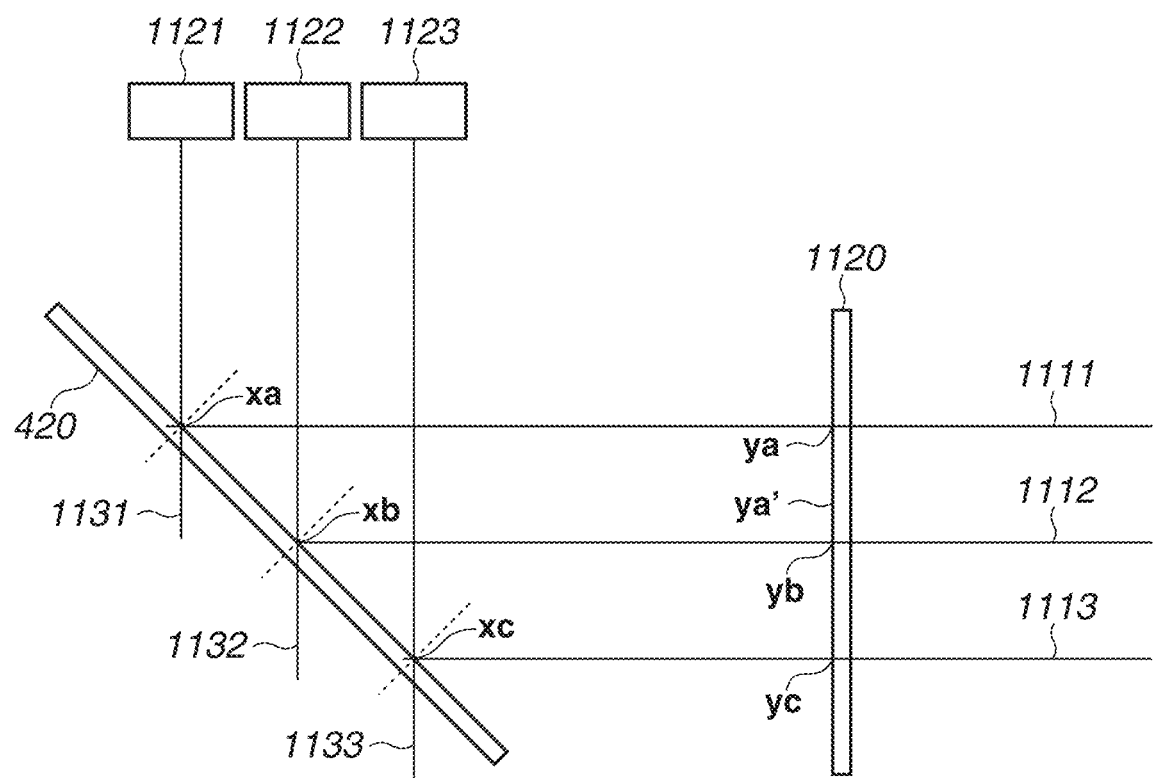
FIG. 11 is a diagram illustrating a relationship between an evaluation value that is calculated and an angular resolution.

A relationship between the evaluation value and the angular resolution will be described below. FIG. 11 is a diagram illustrating a portion of the acquisition apparatus 4 illustrated in FIG. 4. An image sensor 1120 indicates an image sensor of the image capturing apparatus 440 illustrated in FIG. 4. Axes 1131, 1132, and 1133 are axes that respectively pass through light sources 1121, 1122, and 1123 and are perpendicular to the arrangement surface of the illumination device 410 on which the light sources 1121, 1122, and 1123 are arranged. Axes 1111, 1112, and 1113 are axes that are each perpendicular to a surface of the image sensor 1120 and respectively intersect with the axes 1131, 1132, and 1133 at intersection points xa, xb, and xc on a surface of the sample 420. The image sensor 1120 includes sensor elements ya, ya', yb, and yc. The sensor elements ya, yb, and yc are sensor elements through which the axes 1111, 1112, and 1113 pass, respectively, and receive reflected light with the projection angle $\theta_1$ and the light reception angle $\theta_2$ that become equal to each other at the intersection points xa, xb, and xc.

In general, a reflective object excluding a perfect diffuse reflector has the highest reflection intensity in an angle direction (specular reflection direction), so that a peak value of a true variable angle reflection characteristic or a value close to the peak value is obtained from the variable angle reflection characteristics at the sensor elements ya, yb, and yc.

Graphs 1210 and 1220 in FIGS. 12A and 12B represent variable angle reflection characteristics at pixel positions corresponding to the sensor elements ya and ya' in FIG. 11. The surfaces of the sample 420 that corresponds to the sensor elements ya and ya' have the same reflection characteristic. Measurement points 1211 and 1221 are measurement points of variable angle reflection characteristics calculated by the first variable angle reflection characteristic calculation unit 202. Variable angle reflection characteristics 1212 and 1222 are true variable angle reflection characteristics of the target object. Approximation functions 1213 and 1223 are approximation functions derived from the measurement points 1211 and 1221, respectively. In FIGS. 12A and 12B, the image clarity of the target object is high, and the measurement points 1221 do not include a measurement point representing a specular reflection component of the variable angle reflection characteristic 1222 or do not include a value close to a peak value of the variable angle reflection characteristic 1222. Thus, the approximation function 1223 with a peak value lower than that of the variable angle reflection characteristic 1222 is derived.

On the contrary, the measurement points 1211 calculated from the pixel values of light received by the sensor element ya include a value close to a peak value of the variable angle reflection characteristic 1212 because the reflected light from the intersection point xa in the specular reflection direction when the light source 1121 is on is received as illustrated in FIG. 11. Thus, the approximation function 1213 having a high peak value equivalent to that of the variable angle reflection characteristic 1212 can be derived.

As described above, in a case where the angular resolution is low in the configuration of the acquisition apparatus 4 (e.g., the light sources are arranged at great intervals), it is difficult for the first variable angle reflection characteristic calculation unit 202 to obtain a peak value of a true variable angle reflection characteristic or a value close to the peak value for some regions. Further, the some regions depend on the light source arrangement, and with the above-described configuration of the acquisition apparatus 4, regions with a low peak position emerge at intervals same as the light source arrangement intervals. Therefore, pixel value changes are observed at intervals same as the light source arrangement intervals in the peak image, and the power spectrum of the spatial frequency band of the light sources 412 or the evaluation value exhibits a high value.

Figure 13A:
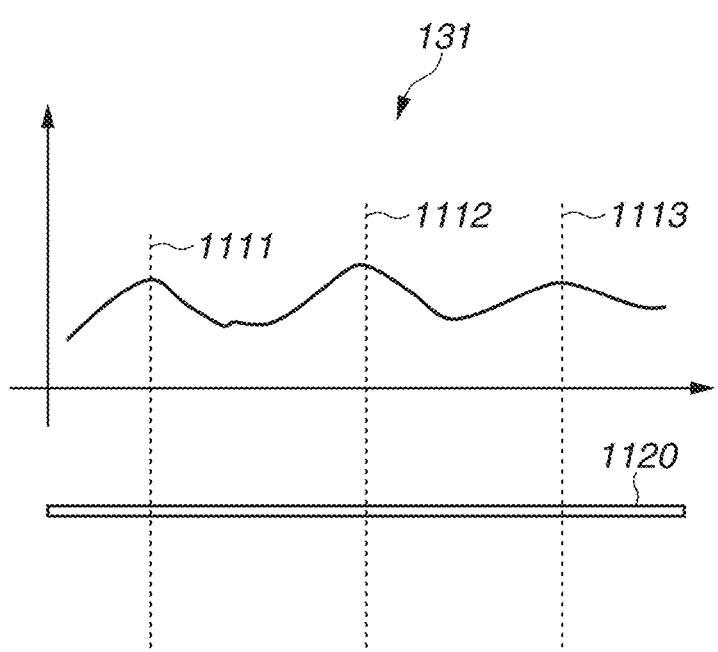
FIGS. 13A and 13B are diagrams illustrating an example of a peak image that is generated.
Figure 13B:
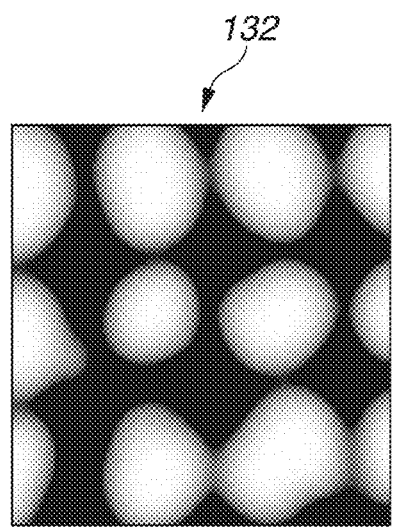

A graph 131 in FIG. 13A is a graph representing pixel values obtained by scanning the peak image in a one-dimensional direction as an example of that described above. The horizontal axis of the graph 131 is the pixel position of the image sensor 1120 illustrated in FIG. 11. The vertical axis of the graph 131 is the pixel value of the peak image. A peak image 132 in FIG. 13B is an example of a two-dimensional peak image. The pixel value of the peak image 132 indicates the peak value of the approximation curve, and differences in period corresponding to the pixel positions of the image sensor 1120 can be checked as in the graph 131.

Figure 14B:
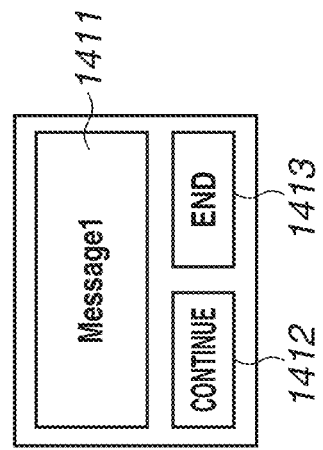
FIGS. 14A and 14B are diagrams illustrating an example of a user interface (UI) that is displayed.
Figure 14A:
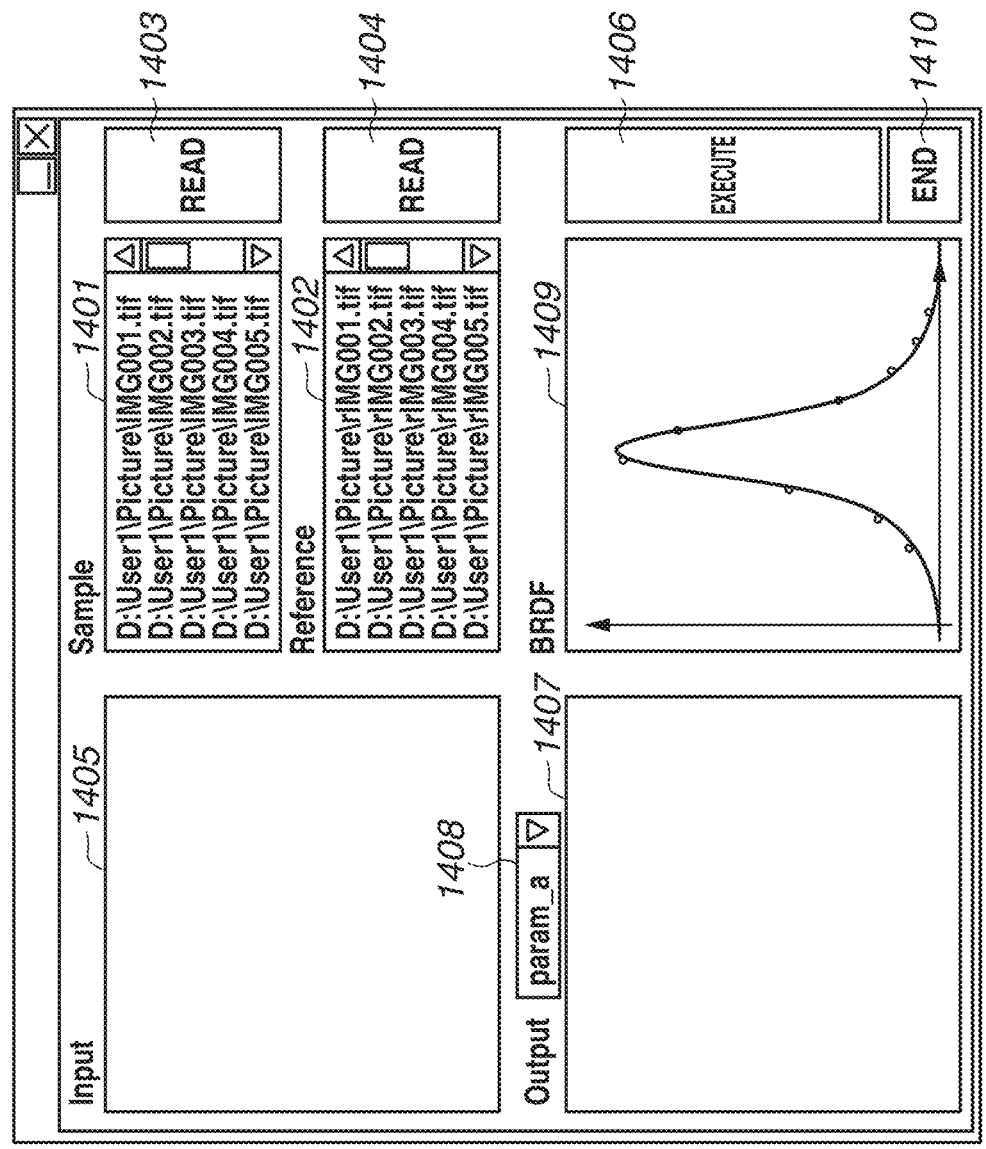

FIGS. 14A and 14B are diagrams illustrating a UI and data that are displayed on the display 15 by the UI display unit 207 in the steps. A UI 141 is displayed at a start of execution of the above-described series of processes. Regions 1401 and 1402 are regions that display lists of file names of a sample (target object) captured image and a reference (standard reflector) captured image that are acquired by the imaging data acquisition unit 201. The files are designated on a dialog displayed when the files are dragged and dropped into the regions 1401 and 1402 or read buttons 1403 and 1404 are pressed. The number at the end of each file name is an identification number corresponding to the light source that is turned on.

A region 1405 displays an image optionally designated and selected by the user from the files displayed in the region 1401 or 1402. The designation and selection are realized by placing a cursor over a desired file name and clicking the file name using the mouse of the input device 13. Various geometric conditions relating to the illumination device 410 and the image capturing apparatus 440 are generated in advance as a setting file, and the setting file is read during activation of the UI 141.

An execute button 1406 is a button for issuing an instruction to execute processing by the first variable angle reflection characteristic calculation unit 202 or the characteristic value output unit 208, and the processing is started at the press of the execute button 1406. At the completion of the processing, a parameter image indicating a parameter (characteristic value) selected using a pull-down button 1408 is displayed in a region 1407. When desired coordinates on the region 1407 are designated and selected, a variable angle reflection characteristic at the coordinates is displayed in a region 1409. The designation and selection are realized by placing a cursor over a desired file name and clicking the file name using the mouse of the input device 13. Further, the displayed variable angle reflection characteristic refers to a curve indicated by the updated variable angle reflection characteristic and the approximation function. An end button 1410 is a button that is pressed after an end of the series of processes to close the UI 141, and in a case where the end button 1410 is pressed during processing, the processing is stopped and ends.

In a case where it is determined that the angular resolution is insufficient in step S9044, a dialog 142 is displayed, and the determination result is displayed in a region 1411. At the press of a continue button 1412 or an end button 1413 by the user, the processing proceeds to step S904 or S905. When the dialog 142 is displayed (it is determined that the angular resolution is insufficient), the peak image is displayed in the region 1407. Thus, the user can qualitatively recognize changes in the light source period (periodic noise due to insufficient resolution).

As described above, the image processing apparatus 1 according to the present exemplary embodiment derives the evaluation value based on the spatial frequency characteristic of the calculated variable angle reflection characteristic and determines whether the angular resolution is insufficient based on the evaluation value. Further, the second variable angle reflection characteristic calculation unit 204 repeats processing until the evaluation value reaches a target value. Thus, data is generated while a decrease in approximation accuracy of the specular reflection component that is caused by an insufficient angular resolution, especially light source periodic noise, is prevented. Furthermore, the user can refer to the visualized light source periodic noise and determine whether to continue the iterative processing.

Other Exemplary Embodiments

While a single channel is described above considering a commonly-used monochrome camera in the foregoing exemplary embodiments, the processing according to the foregoing exemplary embodiments is applicable to each channel of a color camera having two or more channels having different sensitivity characteristics for different wavelengths.

While the threshold values stored in advance in the data storage unit 206 are used in determining whether the angular resolution is insufficient in the foregoing exemplary embodiments, the user can designate and input a threshold value via a UI. Further, a threshold value can be calculated adaptively based on data on measurement points of a variable angle reflection characteristic that is a determination target. For example, smaller threshold values can be set for smaller minimum values of measurement point data to makes it easy to determine that the angular resolution is insufficient. The minimum value herein is considered as the diffuse reflection component. Thus, in a case where the diffuse reflection component is great, the threshold value setting is performed dynamically based on the prediction that the specular component is relatively small.

While the processing of changing the spatial resolution is performed based on the determination result according to the above-described exemplary embodiments, a constraint can be added to the determination of whether to apply the change processing. For example, the user can set a desired value as a lower limit value of the spatial resolution to assure a desired spatial resolution.

While the variable angle reflection characteristic under a low resolution is derived in a case where there is one or more variable angle reflection characteristics for which it is determined that the angular resolution is insufficient according to the first exemplary embodiment, the first exemplary embodiment is not limited to those disclosed herein. In the first exemplary embodiment, as in the second exemplary embodiment, a variable angle reflection characteristic with a decreased spatial resolution (resolution) can be calculated and updated sequentially until there is no more variable angle reflection characteristic for which it is determined that the angular resolution is insufficient. Furthermore, a condition to end the iterative processing can be a condition that the percentage of the variable angle reflection characteristics for which it is determined that the angular resolution is insufficient among the variable angle reflection characteristics that are determination targets is lower than or equal to a predetermined threshold value.

While only one variable angle reflection characteristic that is a processing target is referred to in determining whether the angular resolution is insufficient according to the above-described exemplary embodiments, in a case where the processing of the second variable angle reflection characteristic calculation unit 204 is executed iteratively, the determination can be performed by comparing the variable angle reflection characteristics before and after the previously-executed processing.

For example, a determination function of counting each inverted portion of variable angle reflection characteristics before and after the processing that are plotted on the graph in FIG. 5A and ending the iterative processing in a case where the count value increases in the variable angle reflection characteristic after the processing is added. This decreases the possibility of combining a region having another variable angle reflection characteristic.

While the second variable angle reflection characteristic calculation unit 204 executes processing in a case where at least one pixel with an insufficient number of pieces of valid data is detected according to the above-described exemplary embodiments, a threshold value can be set for the number of pixels. For example, the second variable angle reflection characteristic calculation unit 204 can be configured to perform processing in a case where the percentage of pixels for which it is determined that the number of pieces of valid data is insufficient among the total number of pixels is higher than or equal to a predetermined percentage.

While the first variable angle reflection characteristic calculation unit 202 performs calculation based on imaging data according to the above-described exemplary embodiments, the exemplary embodiments are not limited to those disclosed herein as long as a value associated with a light reception angle and a reflection characteristic can be obtained for a plurality of different light reception angles.

While captured images with different projection angles are acquired according to the above-described exemplary embodiments, captured images with different light reception angles can be acquired by changing the position of the image capturing apparatus 440.

While the peak image is displayed for qualitatively recognizing the light source periodic noise according to the above-described exemplary embodiments, an image can be generated by applying a band-pass filter to the peak image, and the generated image can be displayed to facilitate visual recognition of the light source periodic noise. The band-pass filter is, for example, a filter for cutting power spectra of other than the light source period.

The aspect of the embodiments prevents a decrease in accuracy that is caused by an insufficient angular resolution in the calculation of a variable angle reflection characteristic.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-171103, filed Oct. 9, 2020, which is hereby incorporated by reference herein in its entirety.

What is claimed is:

1. An apparatus comprising:
an acquisition unit configured to acquire a plurality of captured images of a target object imaged under a plurality of different conditions;
a first calculation unit configured to calculate a first reflection characteristic of the target object for each pixel position of the captured images using a first spatial resolution based on the captured images;
a determination unit configured to determine whether an angular resolution of the calculated first reflection characteristic is lower than a first threshold value; and
a second calculation unit configured to calculate a second reflection characteristic of the target object using a second spatial resolution lower than the first spatial resolution based on the calculated first reflection characteristic in a case where the angular resolution is lower than the first threshold value.

2. The apparatus according to claim 1, wherein the acquisition unit acquires the plurality of captured images at a projection angle from a plurality of different light sources to the target object.

3. The apparatus according to claim 1, further comprising a derivation unit configured to derive a parameter of a function approximating the calculated second reflection characteristic.

4. The apparatus according to claim 3, wherein in a case where the angular resolution is lower than the first threshold value, the derivation unit derives the parameter of the function approximating the calculated second reflection characteristic, whereas in a case where the angular resolution is higher than or equal to the first threshold value, the derivation unit derives a parameter of a function approximating the calculated first reflection characteristic.

5. The apparatus according to claim 3, further comprising an output unit configured to output the parameter of the function.

6. The apparatus according to claim 5, wherein the output unit outputs an image including a pixel value of the parameter of the function.

7. The apparatus according to claim 3, wherein the parameter of the function includes a variance and a mean of a normal distribution function.

8. The apparatus according to claim 1, wherein in a case where a number of pieces of data on the first reflection characteristic with a reflection intensity higher than or equal to a second threshold value under the plurality of different conditions is greater than or equal to a third threshold value, the determination unit determines that the angular resolution is higher than or equal to the first threshold value, whereas in a case where the number of pieces of data with the reflection intensity higher than or equal to the second threshold value is less than the third threshold value, the determination unit determines that the angular resolution is lower than the first threshold value.

9. The apparatus according to claim 1, wherein the determination unit transforms a maximum value of each coordinate of an approximation function of the first reflection characteristic to a frequency space, and in a case where an integral value of a power spectrum of a first frequency band of the frequency space is greater than or equal to a fourth threshold value, the determination unit determines that the angular resolution is higher than or equal to the first threshold value, whereas in a case where the integral value of the power spectrum of the first frequency band is less than the fourth threshold value, the determination unit determines that the angular resolution is lower than the first threshold value.

10. The apparatus according to claim 9,
wherein the acquisition unit acquires the plurality of captured images at a projection angle from a plurality of different light sources to the target object, and
wherein the first frequency band is a frequency band based on a spatial frequency of the light sources.

11. A method comprising:
acquiring a plurality of captured images of a target object imaged under a plurality of different conditions;
performing a first calculation to calculate a first reflection characteristic of the target object for each pixel position of the captured images using a first spatial resolution based on the captured images;
determining whether an angular resolution of the calculated first reflection characteristic is lower than a first threshold value; and
performing a second calculation to calculate a second reflection characteristic of the target object using a second spatial resolution lower than the first spatial resolution based on the calculated first reflection characteristic in a case where the angular resolution is lower than the first threshold value.

12. The method according to claim 11, wherein the acquiring acquires the plurality of captured images at a projection angle from a plurality of different light sources to the target object.

13. The method according to claim 11, further comprising deriving a parameter of a function approximating the calculated second reflection characteristic.

14. The method according to claim 11, wherein in a case where a number of pieces of data on the first reflection characteristic with a reflection intensity higher than or equal to a second threshold value under the plurality of different conditions is greater than or equal to a third threshold value, the determining determines that the angular resolution is higher than or equal to the first threshold value, whereas in a case where the number of pieces of data with the reflection intensity higher than or equal to the second threshold value is less than the third threshold value, the determining determines that the angular resolution is lower than the first threshold value.

15. The method according to claim 11, wherein the determining transforms a maximum value of each coordinate of an approximation function of the first reflection characteristic to a frequency space, and in a case where an integral value of a power spectrum of a first frequency band of the frequency space is greater than or equal to a fourth threshold value, the determining determines that the angular resolution is higher than or equal to the first threshold value, whereas in a case where the integral value of the power spectrum of the first frequency band is less than the fourth threshold value, the determining determines that the angular resolution is lower than the first threshold value.

16. A non-transitory computer-readable storage medium storing instructions that, when executed by a computer, cause the computer to perform a method, the method comprising:
acquiring a plurality of captured images of a target object imaged under a plurality of different conditions;
performing a first calculation to calculate a first reflection characteristic of the target object for each pixel position of the captured images using a first spatial resolution based on the captured images;
determining whether an angular resolution of the calculated first reflection characteristic is lower than a first threshold value; and
performing a second calculation to calculate a second reflection characteristic of the target object using a second spatial resolution lower than the first spatial resolution based on the calculated first reflection characteristic in a case where the angular resolution is lower than the first threshold value.

17. The non-transitory computer-readable storage medium according to claim 16, wherein the acquiring acquires the plurality of captured images at a projection angle from a plurality of different light sources to the target object.

18. The non-transitory computer-readable storage medium according to claim 16, further comprising deriving a parameter of a function approximating the calculated second reflection characteristic.

19. The non-transitory computer-readable storage medium according to claim 16, wherein in a case where a number of pieces of data on the first reflection characteristic with a reflection intensity higher than or equal to a second threshold value under the plurality of different conditions is greater than or equal to a third threshold value, the determining determines that the angular resolution is higher than or equal to the first threshold value, whereas in a case where the number of pieces of data with the reflection intensity higher than or equal to the second threshold value is less than the third threshold value, the determining determines that the angular resolution is lower than the first threshold value.

20. The non-transitory computer-readable storage medium according to claim 16, wherein the determining transforms a maximum value of each coordinate of an approximation function of the first reflection characteristic to a frequency space, and in a case where an integral value of a power spectrum of a first frequency band of the frequency space is greater than or equal to a fourth threshold value, the determining determines that the angular resolution is higher than or equal to the first threshold value, whereas in a case where the integral value of the power spectrum of the first frequency band is less than the fourth threshold value, the determining determines that the angular resolution is lower than the first threshold value.

* * * * *